United States Patent
Satou et al.

(10) Patent No.: US 10,208,825 B2
(45) Date of Patent: Feb. 19, 2019

(54) ANTI-VIBRATION DEVICE FOR VEHICLE

(75) Inventors: Yuusuke Satou, Kanagawa (JP);
Masahiko Kondo, Kanagawa (JP);
Yoshinori Hirano, Kanagawa (JP)

(73) Assignee: NISSAN MOTOR CO., LTD., Kanagawa (JP)

( * ) Notice: Subject to any disclaimer, the term of this patent is extended or adjusted under 35 U.S.C. 154(b) by 871 days.

(21) Appl. No.: 14/130,972

(22) PCT Filed: Jun. 12, 2012

(86) PCT No.: PCT/JP2012/065039
§ 371 (c)(1),
(2), (4) Date: Jan. 6, 2014

(87) PCT Pub. No.: WO2013/018443
PCT Pub. Date: Feb. 7, 2013

(65) Prior Publication Data
US 2014/0137830 A1     May 22, 2014

(30) Foreign Application Priority Data
Jul. 29, 2011   (JP) ................. 2011-166536

(51) Int. Cl.
*B60K 5/04*     (2006.01)
*B60K 5/12*     (2006.01)
(Continued)

(52) U.S. Cl.
CPC .............. *F16F 7/00* (2013.01); *B60K 5/1208* (2013.01); *F16F 1/3849* (2013.01); *F16F 7/1011* (2013.01); *B60K 5/04* (2013.01)

(58) Field of Classification Search
CPC ... B60K 5/00; B60K 5/04; B60K 5/12; B60K 5/1208; B60K 5/1216; B60K 5/1241;
(Continued)

(56) References Cited

U.S. PATENT DOCUMENTS 3,825,090 A * 7/1974 Runkle ................ B60K 5/1216
180/292
4,685,531 A * 8/1987 Kopich ................ B60K 5/1283
180/300
(Continued)

FOREIGN PATENT DOCUMENTS

| JP | 11-166584 A | 6/1999 |
| JP | 2003-206991 A | 7/2003 |

(Continued)

OTHER PUBLICATIONS

International Search Report for corresponding International Application No. PCT/JP2012/065039, dated Sep. 4, 2012 (4 pages).
(Continued)

*Primary Examiner* — Robert A. Siconolfi
*Assistant Examiner* — San M Aung
(74) *Attorney, Agent, or Firm* — Osha Liang LLP

(57) ABSTRACT

An anti-vibration device for a vehicle has a first torque rod assembly having a first rod with one end fixed to an engine and the other end fixed to a vehicle body, an inertial mass supported on the first rod, and an actuator that reciprocates the inertial mass in an axial direction of the first rod, and a second torque rod assembly having a second rod with one end fixed to the engine and the other end fixed to a sub-frame that is installed on the vehicle body via an elastic member.

12 Claims, 9 Drawing Sheets

(51) Int. Cl.
*F16K 1/38* (2006.01)
*F16F 7/00* (2006.01)
*F16F 7/10* (2006.01)
*F16F 1/38* (2006.01)

(58) Field of Classification Search
CPC ........ B60K 5/1283; F16F 1/38; F16F 1/3849;
F16F 7/1011; F16F 15/04; F16F 15/08;
F16F 15/022; F16F 7/1005; F16F 7/02;
F16F 7/00; B60G 2202/25; B60G 2206/11
USPC .. 267/140.11, 141, 139, 140.12, 141.2, 293;
180/293, 312
See application file for complete search history.

(56) References Cited

U.S. PATENT DOCUMENTS

| | | | | |
|---|---|---|---|---|
| 4,822,010 | A * | 4/1989 | Thorn | B60G 7/02 267/140.12 |
| 5,074,374 | A * | 12/1991 | Ohtake | B60K 5/1216 180/300 |
| 5,273,261 | A * | 12/1993 | Hamberg | F16F 13/14 180/312 |
| 6,415,884 | B1 * | 7/2002 | Hawener | B60K 5/1216 180/291 |
| 2004/0046450 | A1 | 3/2004 | Yoshida et al. | |
| 2004/0124034 | A1 * | 7/2004 | Komatsu | B62D 21/11 180/312 |
| 2007/0260377 | A1 * | 11/2007 | Miyahara | B60K 5/04 701/41 |
| 2008/0315473 | A1 * | 12/2008 | Nishimae | F16F 1/3849 267/140.11 |
| 2011/0233834 | A1 * | 9/2011 | Kashihara | B60K 5/1241 267/140.4 |
| 2012/0098177 | A1 * | 4/2012 | Satou | F16F 7/1011 267/140.14 |
| 2012/0112395 | A1 * | 5/2012 | Mizobe | F16F 1/3828 267/139 |

FOREIGN PATENT DOCUMENTS

| | | |
|---|---|---|
| JP | 2005-265123 A | 9/2005 |
| JP | 2006-021674 A | 1/2006 |
| JP | 2007-308016 A | 11/2007 |
| JP | 4-191126 B2 | 12/2008 |
| JP | 2009-40238 A | 2/2009 |
| JP | 2011-11586 A | 1/2011 |
| JP | 2011-012757 A | 1/2011 |
| WO | 2011/001799 A1 | 1/2011 |

OTHER PUBLICATIONS

Search Report issued in corresponding European Application No. 12819734.0, dated Nov. 14, 2014 (8 pages).

* cited by examiner

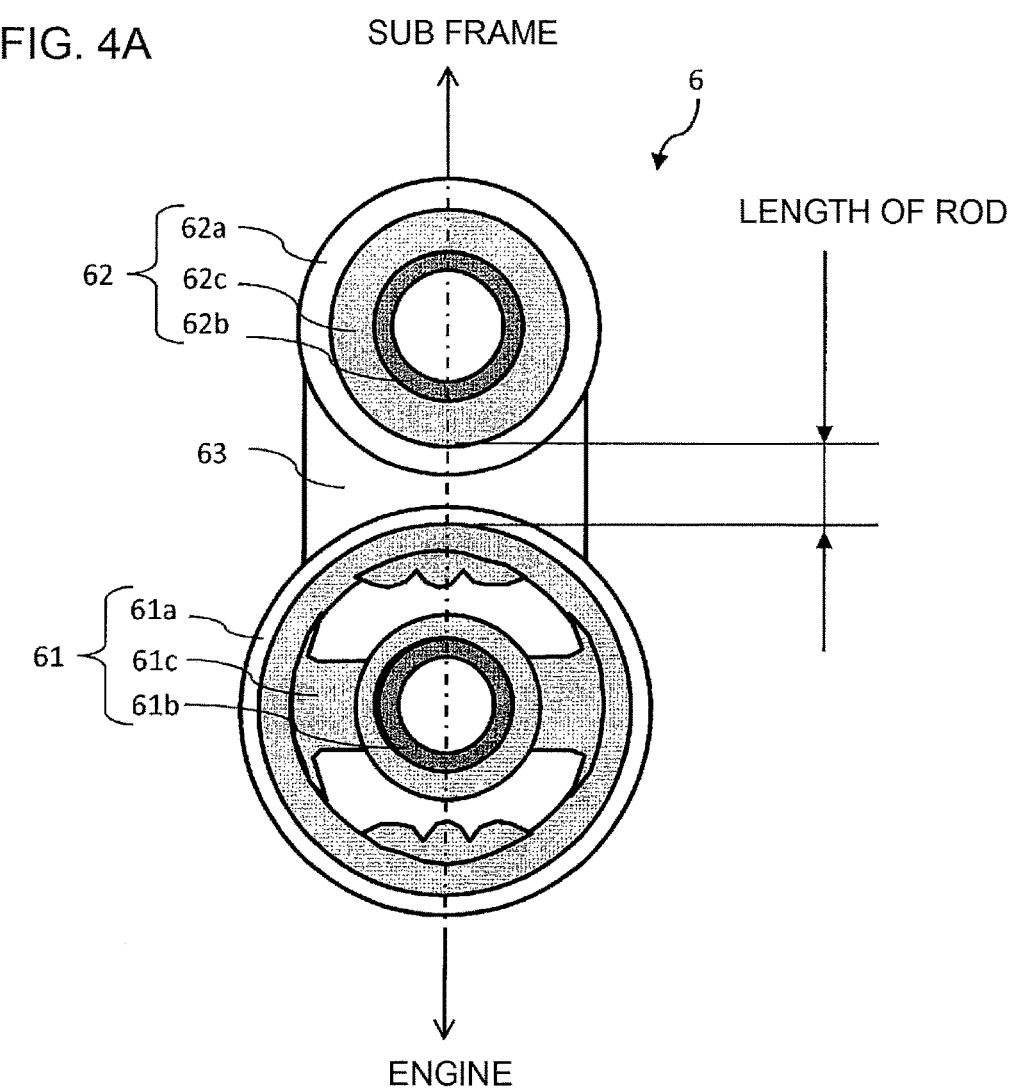

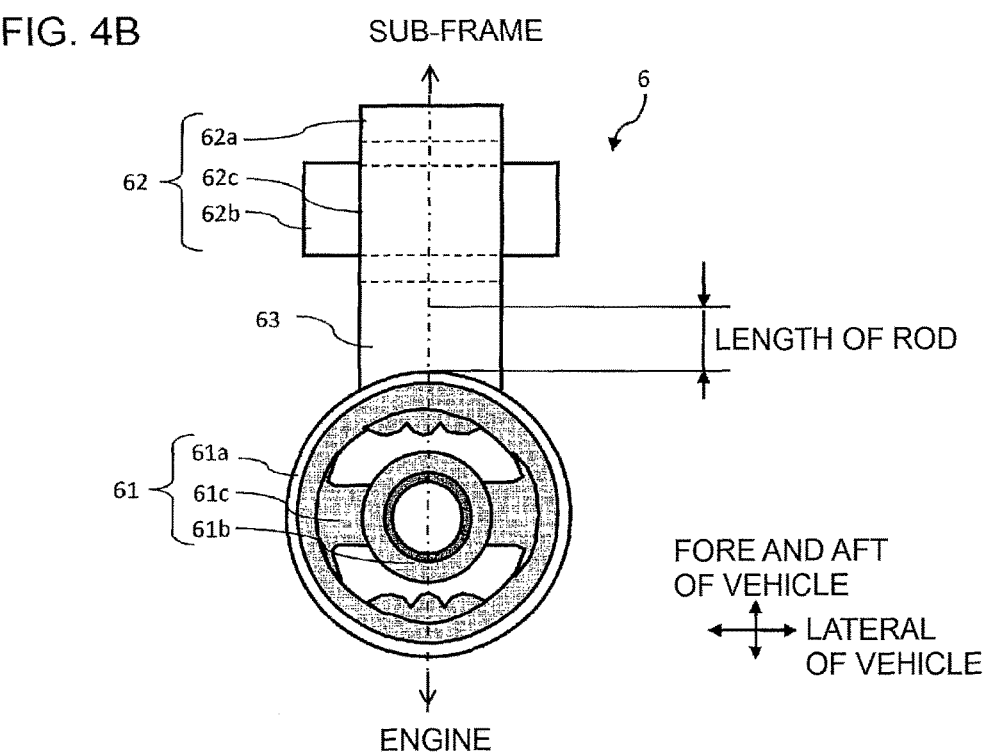

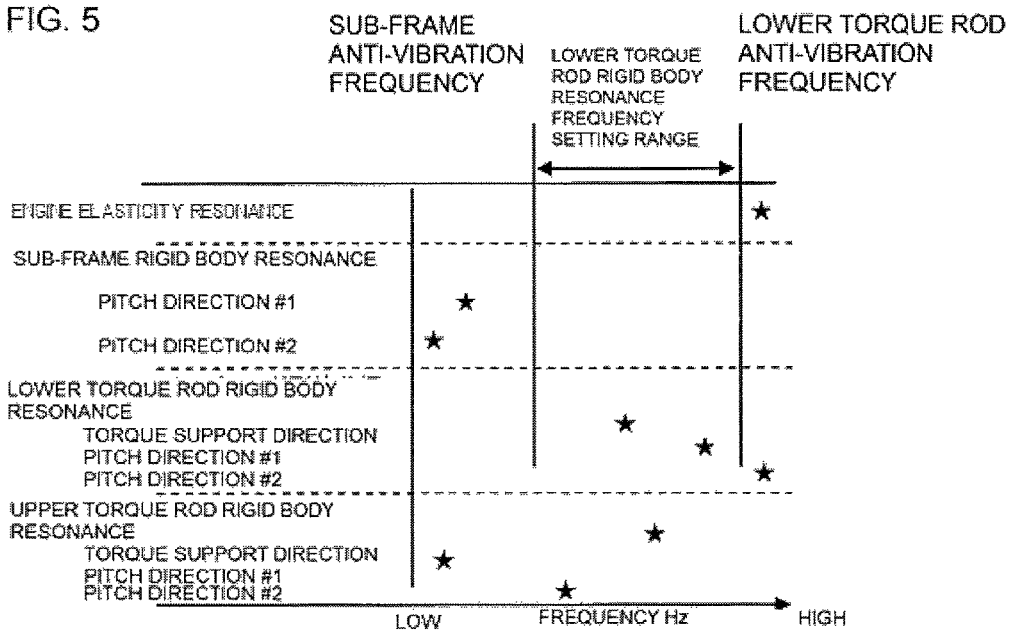
FIG. 5
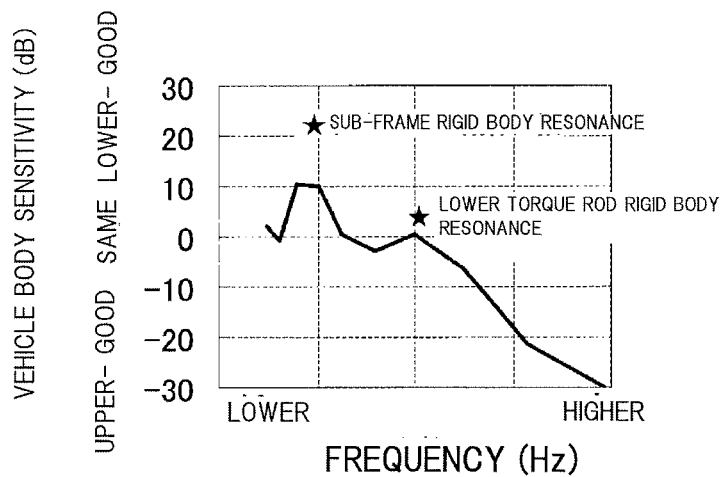
FIG. 6  VEHICLE BODY SENSITIVITY RATIO OF UPPER AND LOWER TORQUE RODS FIG. 8B
DISPLACEMENT AMOUNT OF INPUT POINT
FOR THE SAME MAGNITUDE OF INPUT
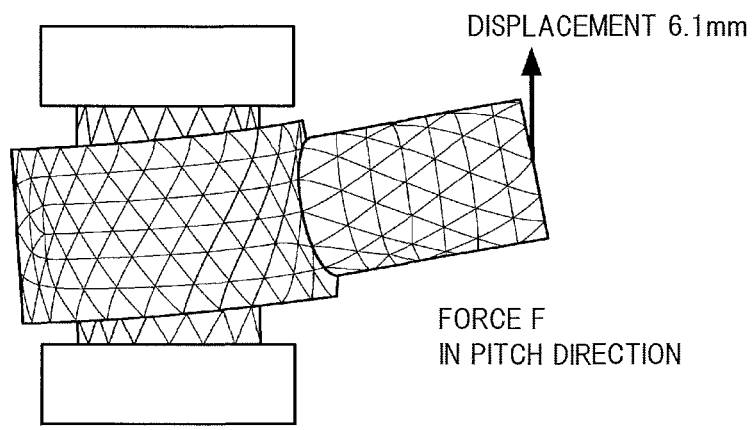
DISPLACEMENT 6.1mm
FORCE F
IN PITCH DIRECTION
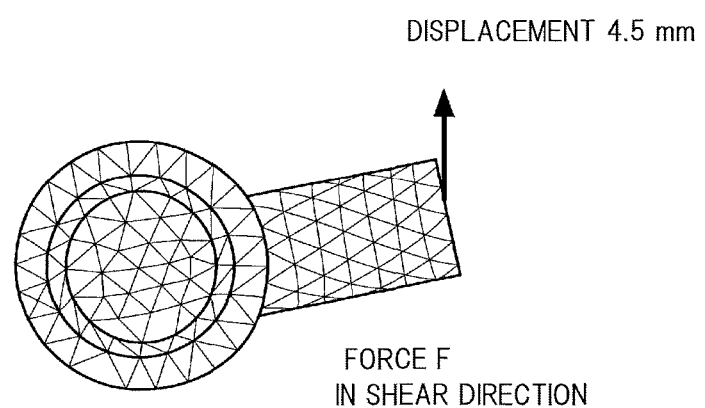
DISPLACEMENT 4.5 mm
FORCE F
IN SHEAR DIRECTION

ANTI-VIBRATION DEVICE FOR VEHICLE

TECHNICAL FIELD

The present invention relates to a device for suppressing the vibration transmitted to a vehicle body side from an engine as a vibration source.

BACKGROUND

As a vibration damping device or an anti-vibration device for suppressing or damping the vibration transmitted to the vehicle body side from the engine, such an anti-vibration device has been proposed in which the rigid resonant frequency of a torque rod is set lower than the resonant frequency of the engine and a force is generated by an actuator, which is proportional to an axial displacement of the torque rod (see Patent Document 1).

Patent Document 1: JP No. 2011-12757 A

SUMMARY OF THE INVENTION

With conventional anti-vibration apparatuses, since a torque rod with an actuator has to be provided on each of upper and lower positions of the engine that is installed in pendulum manner, there is an increase in vehicle cost.

One or more embodiments of the present invention provides an inexpensive anti-vibration device for a vehicle.

According to one or more embodiments of the present invention, a first torque rod assembly has an actuator while one end of a second torque rod assembly is fixed to a sub-frame.

According to one or more embodiments of the present invention, since one end of the second torque rod assembly is fixed to the sub-frame and, thus, even without an actuator, it is possible to suppress the in-vehicle sound generated transmitted through the second torque rod assembly. Consequently, the second torque rod assembly may be configured in an inexpensive structure without an actuator.

BRIEF DESCRIPTION OF THE DRAWINGS

FIG. 4A is a cross sectional view of an example of a lower torque rod assembly shown in FIG. 1A;

FIG. 4B is a cross sectional view of another example of lower torque rod assembly shown in FIG. 1A;

FIG. 5 is a diagram showing resonance frequency characteristics of elements of an anti-vibration device according to one or more embodiments of the present invention;

FIG. 6 is a diagram showing the relationship of the vehicle body sensitivity ratio relative to a vibration frequency of the vehicle to which the anti-vibration shown in FIG. 5 is applied;

FIG. 8B is a diagram showing the result verifying the rigidity sensitivity using the analysis mode in FIG. 8A.

DETAILED DESCRIPTION

Embodiments of the invention will be described below with reference to the drawings. In embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid obscuring the invention.

Figure 1A:
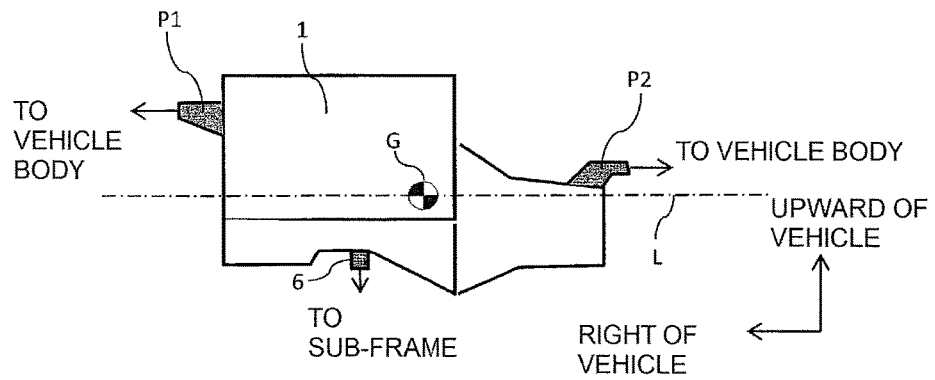
FIG. 1A is a front view showing an example of applying an anti-vibration device according to one or more embodiments of the present invention to a vehicle engine.
Figure 1B:
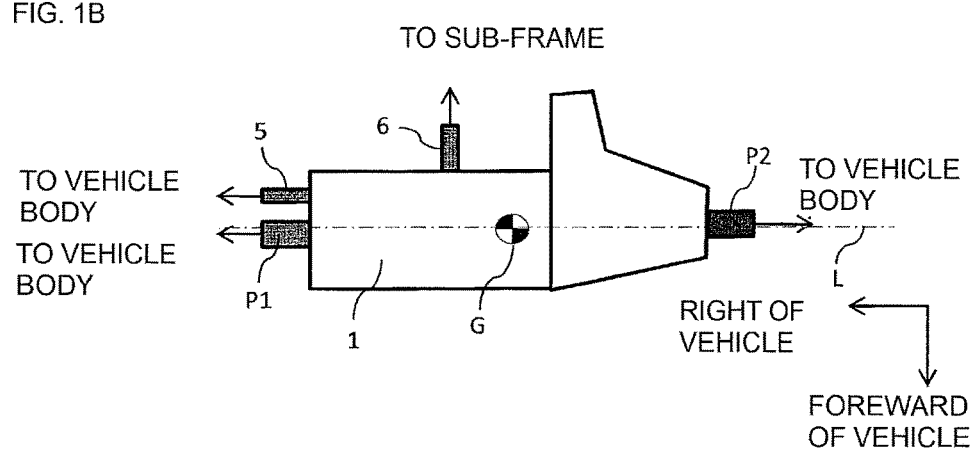
FIG. 1B is a plan view of FIG. 1A.
Figure 2:
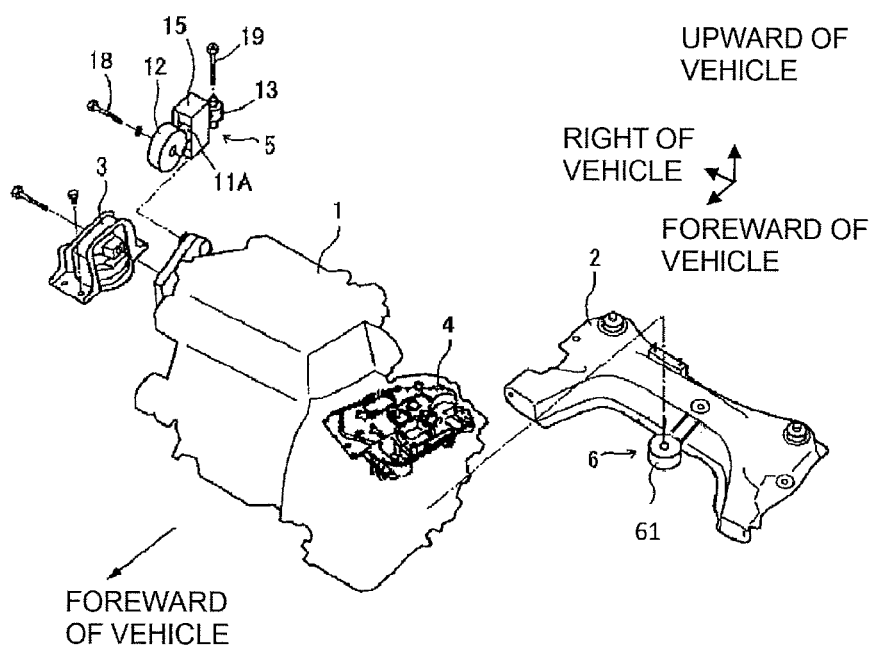
FIG. 2 is an exploded perspective view of FIGS. 1A and 1B.

First, description will be given of a so-called engine of pendulum type to which a vehicle anti-vibration device according to one or more embodiments of the present invention is applied. A supporting structure applied in an engine of pendulum type refers to such a supporting structure shown in FIGS. 1A and 1B for a transverse engine 1 in which a principle inertia axis L of the engine 1 is disposed parallel to a vehicle width direction (the direction perpendicular to the vehicle travel direction, also referred to as left-and-right direction of the vehicle) where two supporting points P1, P2 supporting the engine 1 are positioned, in the plan view of FIG. 1B, in the vicinity of the principle inertial axis L of the engine and at axially opposite sides with respect to the center of gravity G. Further, in the side view shown in FIG. 1A, both points are disposed in the upward direction of the vehicle above the principle inertial axis. Note that both support points P1, P2 are formed by a left and right engine mounts 3, 4, respectively as shown in FIG. 2.

According to the support structure of the pendulum type, in addition to supporting the engine 1 by suspending like a pendulum, the center of gravity of the engine G that swings about a straight line connecting the support points P1, P2 is supported by a rod-shaped members such as the torque rod assembly 5, 6 mounted to the vehicle body so that the anti-vibration effects in the similar manner as in the conventional structure can be advantageously obtained with less number of parts. In other words, in a pendulum type engine support structure, the engine 1 swings or tilts about an axis connecting two support points P1, P2 during the operation of the engine 1 by a rotational inertia force. To prevent this tilting motion and to support the engine 1, a first torque rod assembly 5 that couples the roughly upper half of the engine 1 and the vehicle body side member as well as another, second torque rod assembly 6 are provided. The first torque rod assembly 5 is coupled to the engine 1 from the upper right side of the vehicle while the other, second torque rod assembly 6 is coupled to the engine 1 from the lower side of the vehicle, respectively. These two torque rod assemblies prevent the pendulum type engine 1 to be tilted or inclined.

The above-described engine 1 is formed for example in an in-line four cylinder engine with a secondary balancer or a V-6 engine. In the four cylinder engine with a secondary balancer or a V-6 engine, since the unbalanced inertial force is small at basic orders of engine rotation, mainly the reaction force of the engine torque fluctuation acts on the engine 1. Therefore, at the basic order of engine rotation, due to input from the two torque rod assemblies 5, 6 described above at the basic order of engine rotation, it has become apparent to the present inventors that the vehicle sound and vehicle vibration occur. Furthermore, it is known that, during acceleration of the vehicle mainly, the in-vehicle sound up to about 1000 Hz, which is composed of a higher number of basic order, becomes a problem for the occupant.

As described above, the anti-vibration or vibration-proof device for a vehicle according to one or more embodiments of the present invention includes two torque rod assemblies 5, 6. The first torque rod assembly 5, also referred to as an upper torque rod, is mounted between the top of the engine and the vehicle body, as shown in FIG. 1B. In contrast, the second torque rod assembly 6, also referred to as the lower torque rod, as shown in FIGS. 1A, 1B and 2, is mounted between the lower portion of the engine 1 and the sub-frame 2. Here, the vehicle body to which the first torque rod assembly 5 is mounted refers to a rigid member that constitutes a cabin a passenger gets into or that supports the cabin, and is represented by a main frame (vehicle frame), for example. Stated differently, ii is to be understood that the sub-frame to which the second torque rod assembly 6 is fixed so as to be mounted via an elastic member to the main frame is not regarded here as the vehicle body. The sub-frame 2 is intended to be such a member attached to the vehicle body specifically via a rubber bush or an insulator, and a suspension frame may be cited as a specific example.

Figure 3:
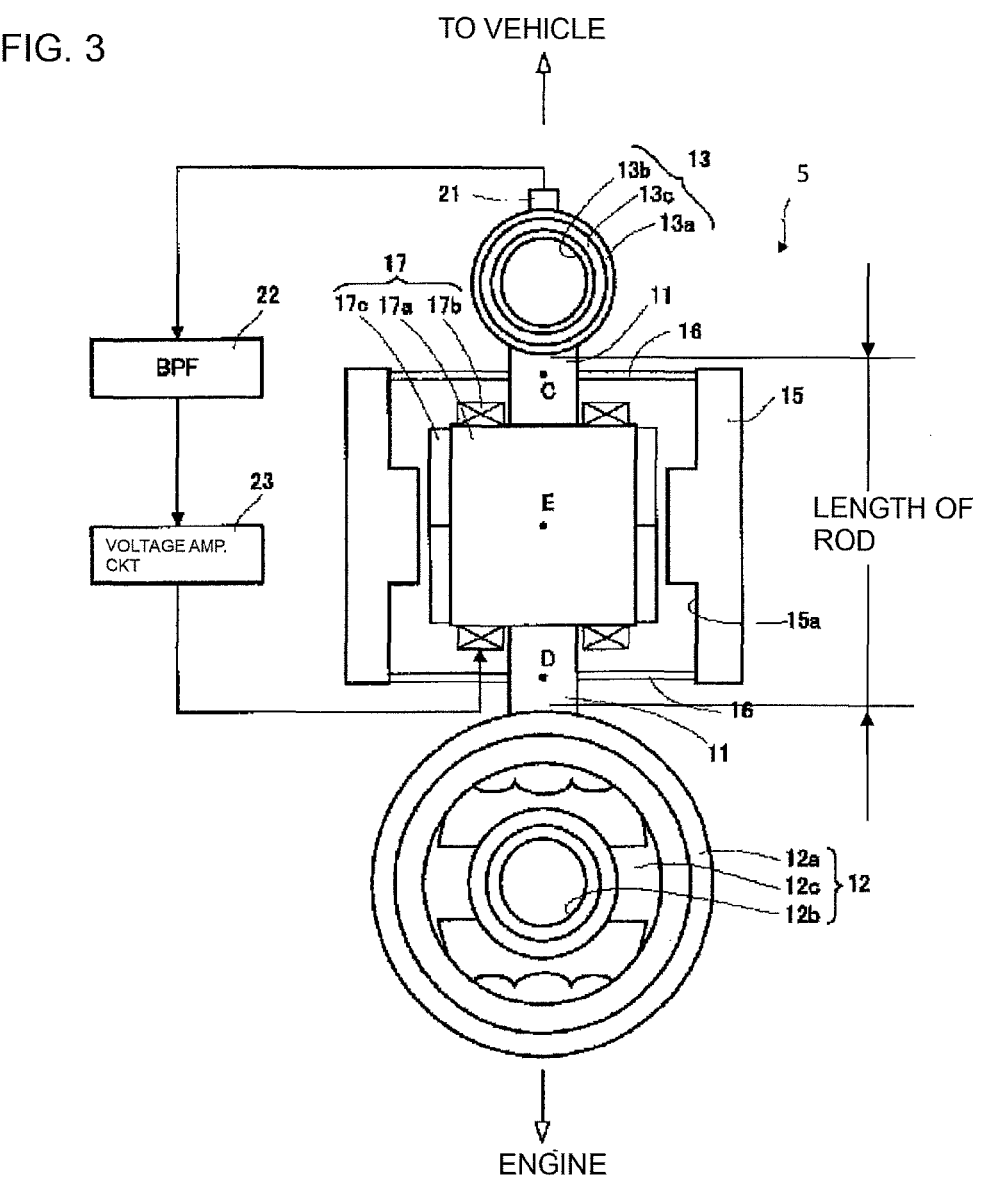
FIG. 3 is a cross sectional view showing the upper torque rod assembly shown in FIG. 1B.
Figure 7:
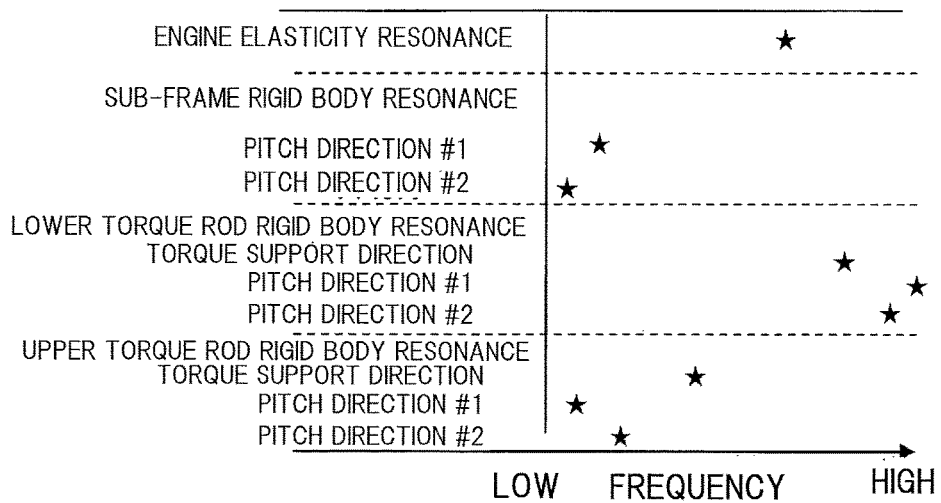
FIG. 7 is a diagram showing the relationship among resonance frequencies of the engine, the sub-frame, the lower-torque rod assembly, and the upper-torque rod assembly according to one or more embodiments of the present invention.

As shown in FIGS. 2 and 3, the first torque rod assembly 5 has a first rod 1 with the bush 12 of its one end fixed to the upper portion of the engine 1 while the bush 13 of its other end fixed to the vehicle body, an inertial mass 15 supported on the first rod 11, and an actuator 17 to cause the inertial mass 15 to reciprocate in an axial direction of the first rod 11.

FIG. 3 shows a main part sectional view of the upper torque rod 5. A pair of bushes 12, 13 are fixed by welding to both ends of the rod-shaped first rod 11. The bush 12 fixed to the engine side is constituted by a cylindrical outer tube 12a, a cylindrical inner tube 12b concentric with the outer cylindrical tube 12a, and an elastic body 12c (sound insulator). The bush 12 is mounted to the engine 1 by a bolt (not shown) which is inserted in a direction perpendicular to the paper surface in FIG. 3 relative to the inner cylindrical tube 12b.

On the other hand, the bush 13 fixed on the vehicle body side is as in the case of the bush 12 described above is composed of a cylindrical outer tube 13a, a cylindrical inner tube 13b concentric with the outer tube 13a, and an elastic body (sound insulator) connecting the outer tube 13a and the inner tube 13b. The bush 13 is fixed to a member on the vehicle body side by a bolt (not shown) inserted in a direction perpendicularly to the paper space in FIG. 3 relative to the inner tube 13b.

Note that, in one or more of the embodiments shown, such a structure is illustrated in which the bush 12 is mounted to the engine 1 and the bush 13 is fixed to the vehicle body side. However, this structure is not limitative. Instead, the bush 12 may be fixed to the vehicle body and the bush 13 may be fixed to the engine 1. Further, with respect the upper torque rod 5, an example is shown in FIG. 3, in which two bolts are inserted into the inner tubes 12b, 13b of the bushes 12, 13 are disposed parallel to each other. However, in the upper torque rod shown as an example in FIG. 2, two bolts inserted respectively into the inner tubes 12b, 13b of the bushes 12, 13 are disposed perpendicular to each other. The direction may be suitably changed in accordance with the shape of the fixing portion on the vehicle body side and that on the engine fixing portion.

The elastic body (sound insulation) 12c, 13c according to one or more embodiments of the present invention is a member that combines the functions of spring and damping, and can use an elastic rubber, for example.

In the upper torque rod 5 according to one or more embodiments of the present invention, the diameters of the outer tube and the inner tube differ with respect to the bushes 12, 13. More specifically, the diameter of the outer tube 13a and that of the inner tube 13b of the bush 13 are set relatively smaller than the corresponding the diameter the outer tube 12a and that of the inner tube 12b of the bush 12. Further, the rigidity of the elastic body 13c of the bush 13 is set relatively greater than the rigidity of the elastic body 12c of the bush 12. By making the rigidity of the elastic bodies 12c, 13c of the pair of the bushes 12 and 13 different from each other, an engine rigid body resonance and the rod rigid body resonance along the axial direction of the rod suitable for doubly vibration proofing at two different frequencies.

Figure 9:
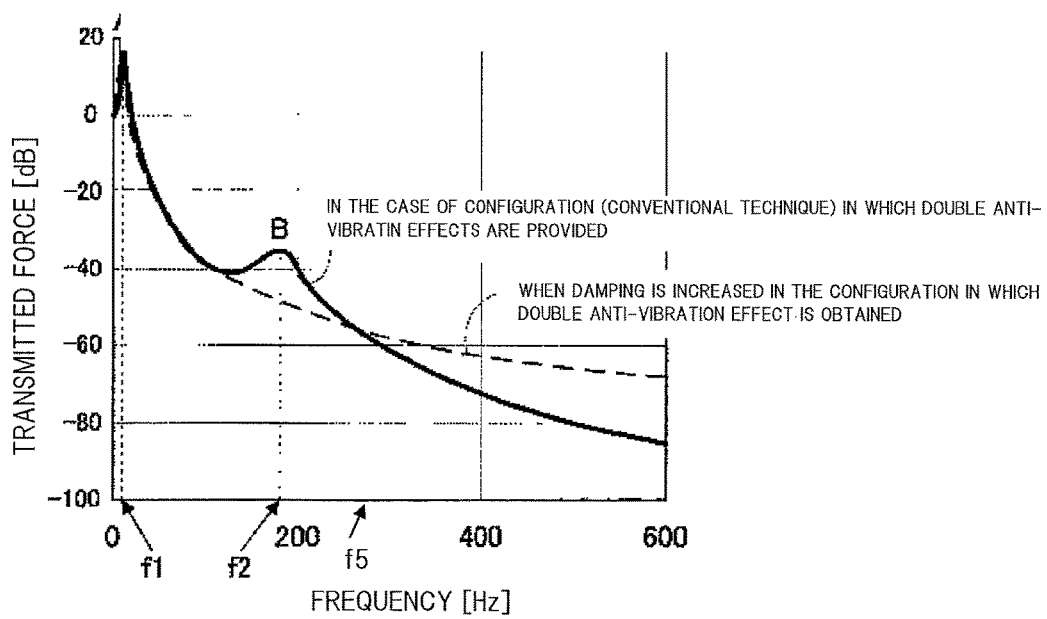
FIG. 9 is a frequency characteristic diagram of the transmission power by the structure producing double vibration proofing according to one or more embodiments of the present invention.

That is, as shown by the solid line in FIG. 9, the engine rigid body resonance A in the axial direction of the rod determined by the rigidity or stiffness of the elastic body or member 12c of the bush 12 results at the frequency f1 [Hz] near zero, while the rod rigidity resonance B determined by the rigidity of the elastic member 13c of the bush 13 is produced at f2 [Hz] close to 200 Hz. For ease of understanding, when description is given on the basis of the spring mass system that extremely simplifies the engine rigid body resonance and the rod rigid body resonance, the engine rigid body resonance A is determined by the engine mass and the rigidity (spring constant) of the elastic body 12c of the bush 12, while the rod rigidity body resonance B is determined by the mass of the first rod 11 (and those of each outer periphery portion) representing a mass between the elastic body 12c of the bush 12 and the elastic body 13c of the bush 13 and the rigidity (spring constant) of the elastic body 13c of the bush 13.

In a typical vehicle engine, because a bending and/or twisting primary resonant frequency f3 is between approximately 280 Hz and 350 Hz, the transfer of the resonance vibration of the engine bending and/or twisting may be suppressed effectively on the high frequency side (within a vibration proofing range) to achieve the vibration double proof by setting the engine rigid body resonance A to near zero ("0" Hz) and the rod rigid body resonance B to approximately 200 Hz.

Thus, in order to achieve that the engine rigidity body resonance A and/or the rod rigidity resonance B are less than the bending and/or twisting resonant frequency f3 of the engine, it is sufficient to define the rigidity (spring constant) of the elastic body 12c of the bush 12, the mass of the first rod 11 representing the mass between the elastic body 12c of the bush 12 and the elastic body 13c of the bush 13, and the rigidity (spring constant) of the elastic body 13c of the bush 13. Therefore, the double vibration-proof effect is achieved by causing the engine rigid body resonance A and the rod rigidity body resonance B to occur at two different frequencies, i.e., at the frequency f1 in a low frequency range and at a frequency f2 in the medium frequency range, respectively, so that the vibrations transmitter from the engine 1 to the vehicle body may be prevented.

The upper torque rod 5 according to one or more embodiments of the present invention includes an inertia mass 15 made of metal or the like having a magnetic property, an actuator 17, an acceleration sensor 21, a band-pass filter 22, and a voltage amplification circuit 23.

The inertial mass 15 is provided coaxially with the first rod 11 around the first rod 11. When viewed in the axial direction of the first rod 11, the cross section of the inertial mass 15 is shaped so as to be point-symmetrical around the center (center or gravity) of the first rod as a center point, and the center of gravity of the inertial mass 15 coincides with the center of the first rod 11. The inertial mass 15 is shaped in rectangular tube, as shown in FIG. 2, and both ends of the inertial mass 15 in the axial direction of the rod (upper and lower ends in FIG. 3) are connected to the first rod 11 via the elastic support springs 16. The elastic support spring 16 is a plate spring having, for example, a relatively small rigidity. The inner wall 15a of the inertial mass 15 is protruded with a part thereof toward the permanent magnet 17c of the actuator 17, as described below.

The upper torque rod 5 according to one or more embodiments of the present invention is provided with the actuator 17 between the inertial mass 15 and the first rod 11. The actuator 17 is formed by a linear type (linear motion type) and includes a rectangular shaped core 17a, a coil 17b, and a permanent magnet 17c so as to cause the inertial mass 15 in the axial direction of the first rod to reciprocate.

The core 17a forming a magnetic circuit of coil is constituted by laminated steel plates and fixed to the first rod 11. The core is divided into a plurality of members prior to assembly of the upper torque rod 5, and by bonding the plurality of the members by an adhesive to the periphery of the first rod 11 to form an overall rectangular tube shaped core 17a. The coil 17b is wound around this rectangular tube core 17a. The permanent magnet 17c is provided around the outer periphery surface of the core 17a.

Since the actuator 17 is structured in this manner, the inertial mass 15 may be driven linearly, i.e., driving the inertial mass 15 to reciprocate in the axial direction of the first rod by a reactance torque due to the magnetic field generated by the coil 17b and the permanent magnet 17c.

An acceleration sensor 21 for detecting the acceleration of the vibration in the axial direction in the substantially axial center of the first rod 11 as the acceleration of the vibrations transmitted from the engine 1 to the first rod 11 is attached to a tip (upper end in FIG. 3) of the bush 13 in the extension line of the substantially axial center of the first rod 11. A signal representing the acceleration in the axial direction of the rod from the acceleration sensor 21 is input to a voltage amplifying circuit 23 through a band pass filter 22 and the amplified signal by the voltage amplifier circuit 23 is applied to the coil 17b of the actuator 17 (to be subject to voltage control). The voltage amplification circuit 23 may comprise, for example, an operational amplifier.

The inertial mass 15 is supported by relatively soft leaf springs (elastic support spring 16), and, for example, the resonance of the inertial mass 15 relative to the first rod 11 in the axial direction of the rod is assumed to occur at a low frequency of up to 10 Hz between 100 Hz. Since the vibration frequency of the secondary order at an idle speed of the four-cylinder engine is about 20 Hz, when it is possible to reduce the resonant frequency of the inertial mass 15 to 10 Hz, the inertial mass 15 will be prevented to resonate regardless of the operating conditions of the engine 1.

On the other hand, when an attempt is made to set resonant frequency of the inertia mass 15 to a low frequency such as 10 Hz and such a configuration is difficult due to too large magnitude of the inertia mass 15, then, by setting to approximately half or less of the frequency (according to one or more embodiments of the present invention, 200 Hz) of the rod rigid body consonant B to be subject to suppress becomes too large, the resonance frequencies will be set far from each other and the suppression of vibration transmission may be achieved sufficiently as describe below.

Further, by passing an acceleration signal detected by the acceleration sensor 21 through a band-pass filter 22 so as not to perform a control in the extra frequencies, the control stability is enhanced while suppressing reliably in the aimed frequency range with the power consumption being inhibited. The vibration proof region with respect to the rod rigidity body consonance B is positioned in a frequency range equal to or greater than a frequency f5 that is determined by multiplying a predetermined value ($\approx 1.4$) by the consonant frequency f2 of the rod rigidity body B as shown in FIG. 9. Therefore, as a band pass filter 22, such a filter will be selected through which a signal will pass that has a frequency width between a consonance frequency of the inertial mass 15 in the rod axis direction (i.e. a low frequency between 10 H to 100 Hz), including this consonance frequency, and up to a frequency range of the vibration proof region with respect to the rod rigid body consonance B including an upper limit within the vibration proof region at which the control would not diverge (such as 400 Hz, for example).

Then, in order to perform a feedback control that increases damping of the first rod 11 as the control object, within the frequency range of the band pass filter, the actuator 17 is caused to generate a force that is generally proportional to, yet with the opposite sign of, the rod axial direction velocity of the vibration detected by the acceleration sensor 21.

Returning to FIGS. 1A, 1B and 2, the lower torque rod (second torque rod assembly) 6 is installed between the lower portion of the engine 1 and the sub-frame 2 and has a second rod 63, in which the bush 61 on the one end thereof is fixed to the engine 1, while the bush 62 on the other end thereof is fixed to the sub-frame which in turn is installed to the vehicle body via an elastic member or body.

FIG. 4A is a schematic plan view of the lower torque rod 6 in which a pair of bushed 61, 62 are fixed to both ends of the second rod 63, respectively through welding. The bush 61 fixed to the engine side is constituted by a cylindrical outer tube 61a, a cylindrical inner tube 61b concentric with the outer cylindrical tube 61a, and an elastic body 61c (sound insulator) connecting the outer cylindrical tube 61a and inner cylindrical tube 61b. The bush 61 is mounted to the engine 1 by a bolt (not shown) which is inserted in a direction perpendicular to the paper surface in FIG. 4A relative to the inner cylindrical tube 61b.

Meanwhile, similarly to the bush 61, the bush 62 fixed on the vehicle body side is composed of a cylindrical outer tube 62a, a cylindrical inner tube 62b concentric with the outer tube 62a, and an elastic body (sound insulator) connecting the outer tube 62a and the inner tube 62b. The bush 13 is fixed to a sub-frame 2 by a bolt (not shown) inserted in a direction perpendicularly to the paper space in FIG. 4A relative to the inner tube 62b.

Incidentally, one or more embodiments of the present invention has a configuration in which the bush 61 is fixed to the engine 1 while the bush 62 is fixed to the sub-frame 2. The configuration is not limited thereto, and the bush 61 may be fixed to the sub frame 2 and the bush 62 may be fixed to the engine 1.

Further, with respect the lower torque rod 6, an example is shown in FIG. 4A, in which two bolts are inserted into the inner tubes 61b, 62b of the bushes 61, 62 are disposed parallel to each other. However, in the lower torque rod shown as an example in FIG. 4B, two bolts inserted respectively into the inner tubes 61*b*, 62*b* of the bushes 61, 62 are disposed perpendicular to each other. In particular, with respect to the direction of attachment of the bush formed of small diameter to the sub-frame 2, the bolt is configured to be inserted in the left to right direction of the vehicle.

Figure 8A:
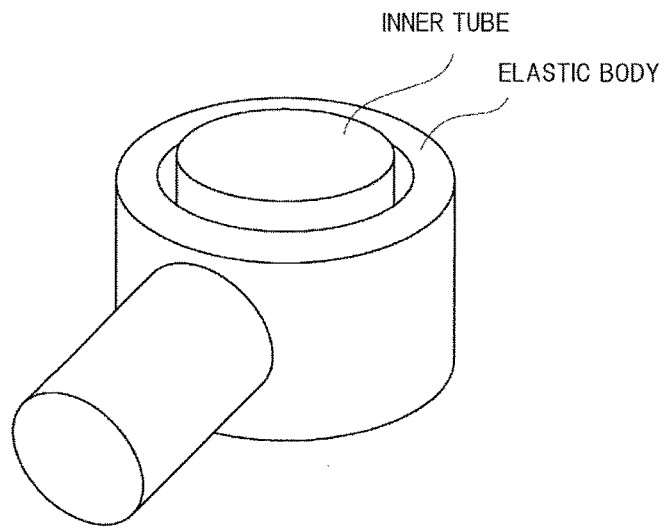
FIG. 8A is a perspective view showing an analysis model for verifying the rigidity sensitivity of the torque rod in both the pitch direction and sharing direction according to one or more embodiments of the present invention.

FIG. 8A is a perspective view showing an analysis model of the torque rod and illustrates a portion corresponding to the bush 62 of the lower torque rod 6. Using the analysis model in the figure, a displacement when a force F is applied in the pitch direction as shown in the upper part of FIG. 8B as well as a displacement when the force F is applied in the shear direction as shown in the lower part of FIG. 8B are respectively measured. As a result, it turned out that the sensitivity has been relatively higher in the case of the force F being applied in the pitch direction. In other words, the rigidity is relatively higher in the case of the force F being applied in the shear direction. Therefore, as shown in FIG. 4B, by fixing the bush 62 with a high sensitivity in the pitch direction in the shear direction, the rigid body consonance frequency of the lower torque rod 6 in the pitch direction may be set higher so that the vibration transmission to the vehicle body may be suppressed.

The sub-frame 2 does not represent the vehicle body itself, but is rather a vehicle body part installed to the body via an elastic member such as an elastic rubber and can be exemplified by a suspension frame for supporting the suspension device. When the lower torque rod 6 can be fixed to the suspension frame as an existing component, a vibration damping effect may be exhibited without weight up. However, the sub-frame is not limited to the suspension frame, and may be applied to other components attached to the vehicle body via an elastic member.

As described above, in the anti-vibration or vibration proof device for a vehicle according to one or more embodiments of the present invention, while providing the inertial mass 15 and the actuator 17 for driving the inertial mass on the upper torque rod 5 as the first torque rod assembly, with respect to the lower torque rod 6 representing the second torque rod assembly, both the inertial mass 15 and the actuator 17 are omitted, but one end of the lower torque rod 6 is fixed to the sub-frame that is installed to the vehicle via an elastic member, instead.

That is, since the upper toque rod 5 directly attached to the vehicle body has an actuator 17 and the inertia mass 15, it is possible to control the vehicle sound generated by transmitting the upper torque rod 5. On the other hand, because the lower torque rod 6 is fixed to the sub-frame 2 which in turn is fixed through an elastic member such as rubber, a vehicle noise generated by transmitting the lower torque rod 6 can also be suppressed so that a pendulum type platform may be applied to a large torque engine 1. As a result, it is possible to reduce the weight and cost of the vehicle. Moreover, fuel efficiency is improved, and acceleration performance is improved.

Further, in the anti-vibration device for a vehicle according to one or more embodiments of the present invention, compared to the axial length of the first rod 11 (in an engine torque support direction) of the upper torque rod 5 shown in FIG. 3, the axial length of the second rod 63 of the lower torque rod 6 shown in FIG. 4A or 4B is set shorter. Since the lower torque rod 6 may be structured to be shorter in the rod length in return for the elimination of the inertial mass 15 and the actuator 17, the rigid body resonant frequency can be set at a higher frequency as compared to the upper torque rod 5. The situation is illustrated in FIG. 5. The rigid body resonant frequency of the lower torque rod 6 is set in the high frequency region in both the torque support direction and pitch directions.

Because the sub-frame 2 represents a vehicle body part that is subject to receive a force, though the resonant frequency of the rubber support portion to the vehicle body existing in a relatively high frequency, by setting the resonant frequency higher, the natural frequency of the lower torque rod 6 may be consequently raised in both the pitch direction and the up-and-downward direction than the rigid body resonant frequency of the sub-frame 2 in the up-and-downward direction of the vehicle so that increase due to the rigid body resonance of the lower torque rod 6 may be inhibited from increasing.

Further, in the vehicle anti-vibration device according to one or more embodiments of the present invention, the large diameter bush 61 of the second rod 63 of the lower torque rod 6 is configured such that the maximum length in the vertical direction of the vehicle body is formed shorter as compared to the maximum length in the left to right or the lateral direction of the vehicle body. When explaining with reference to FIG. 4A, compared to the maximum length of the left and right direction of bush 61, i.e. the outer diameter of the outer tube 61*a*, the maximum length of the vehicle vertical or up- and downward direction of bush 6, i.e. the maximum length in the direction perpendicular to the paper surface is set shorter.

Due to this, since it is possible to reduce the dimension in the direction sensitive to the inertial mass in the pitch direction of the lower torque rod 6, the rigid body resonant frequency in the pitch direction of the lower torque rod 6 can set higher so that the transmission to the body may be suppressed. Furthermore, because this dimension also represents a vertical direction of the vehicle body, impact on the minimum height above ground can be reduced.

Further, in the anti-vibration or damping device for a vehicle according to one or more embodiments of the present invention, as shown in FIG. 4B, when the bush 62 at the small diameter side of the second rod 63 of the lower torque rod 6 is fixed to the sub-frame 2 in the axial direction along the vehicle lateral direction, the bush 62 will be supported in the shear direction of the smaller diameter bush 62 that has a high sensitivity with respect to the rigidity in the pitch direction of the lower torque rod 6. Thus, the rigid body resonant frequency of the lower torque rod 6 in the pitch direction may be set higher so that the transmitted force to the vehicle body may be suppressed.

Further, in the anti-vibration device for a vehicle according to one or more embodiments of the present invention, as shown in FIG. 5, the rigid body resonant frequency in the vertical direction and the pitch direction of the lower torque rod 6 is set higher than the rigid body resonant frequency of the sub-frame 2 in both the pitch direction and the vertical direction in at least one operating condition (the operating condition shown in figure is a fully accelerated operation).

By setting the rigid body resonant frequency of lower torque rod 6 in the pitch and vertical directions than the rigid body resonant frequency of the sub-frame 2, since these are free of the resonance, the vehicle noise may be reduced Further, in the anti-vibration device for a vehicle according to one or more embodiments of the present invention, as shown in FIG. 5, the rigid body resonant frequency in the vertical direction and the pitch direction of the lower torque rod 6 is set higher than the rigid body resonant frequency in the engine torque support direction. By setting a high frequency torque rod rigid body resonance in the vertical direction and the pitch direction increasing the vehicle sound, while maintaining eigen values in the torque support direction that affects the anti-vibration performance, the influence of the torque rod rigid body resonance in the vertical direction and the pitch direction may be suppressed while obtaining the vibration damping effect of the lower torque rod 6.

Further, in the anti-vibration device for a vehicle according to one or more embodiments of the present invention, as shown in FIG. 5, the primary resonant frequency of the sub-frame 2 is set to be less than the primary elasticity rigid body resonant frequency of the engine 1. In addition, the rigid body resonant frequency of the upper torque rod 5 in the engine torque support direction is set equal to or less than the primary elasticity resonant frequency of the engine 1. Moreover, the rigid body resonant frequency of the lower torque rod 6 in the engine torque support direction is set to be equal to or greater than the primary rigid body resonant frequency of the sub-frame 2 and equal to or less than the primary elasticity resonant frequency of the engine 1.

Since the rigid body resonant frequency of the lower torque rod 6 is set between the resonant frequency of the sub-frame 2 and the elastic resonant frequency of the engine 1, while mitigating vehicle sound increase due to the rigid body resonance of the lower torque rod 6, the increased vibration due to the elasticity resonance of the engine is allowed to decrease significantly by the damping effects by the rigid body resonance of the lower torque rod 6. As a result, it is possible to reduce the vehicle noise. For reference, in FIG. 6, the body sensitivity ration between the upper toque rod 5 and the lower torque rod 6 of the anti-vibration device for a vehicle according to one or more embodiments of the present invention.

Incidentally, according to one or more embodiments of the present invention shown in FIG. 5, although the rigidity resonant frequency of the lower torque rod 6 in the engine support direction is set smaller than the elastic resonant frequency of the engine 1, the rigidity resonant frequency of the lower torque rod 6 in the engine support direction may be set higher than the elastic resonant frequency of the engine 1.

The upper torque rod 5 described above corresponds to a first torque rod assembly according to one or more embodiments of the present invention while the lower torque rod 6 described above corresponds to a second torque rod assembly according to one or more embodiments of the present invention.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

1 . . . engine
2 . . . sub-frame
3, 4 . . . engine mount
P1, P2 . . . support point
5 . . . upper torque rod
6 . . . lower torque rod
11 . . . first rod
12, 13 . . . bush
15 . . . inertial mass
17 . . . actuator
21 . . . acceleration sensor
22 . . . band-pass filter
23 . . . voltage amplification circuit
61, 62 . . . bush
63 . . . second rod

The invention claimed is:

1. An anti-vibration device for a vehicle comprising:
a first torque rod assembly comprising:
a first rod with one end fixed to an engine and the other end fixed to a vehicle body,
an inertial mass supported on the first rod, and
an actuator that reciprocates the inertial mass in an axial direction of the first rod; and
a second torque rod assembly comprising:
a second rod with one end fixed to the engine and the other end fixed to a sub-frame that is installed on the vehicle body via an elastic member,
wherein the second torque assembly has no inertial mass and no actuator, and
wherein a rigid body resonant frequency of the second torque rod assembly in both pitch and vertical directions is set higher than a rigid body resonant frequency of the sub-frame in both pitch and vertical direction under at least one operating condition.

2. The anti-vibration device of claim 1, wherein an axial length of the second rod is shorter than the first rod.

3. The anti-vibration device of claim 1, wherein a large diameter end of the second rod is configured such that the maximum length in a vertical direction of the vehicle body is set shorter than a maximum length in a lateral direction of the vehicle body.

4. The anti-vibration device of claim 1, wherein a small diameter end of the second rod is fixed to the sub-frame or the engine from an axial direction along the lateral direction of the vehicle body.

5. An anti-vibration device for a vehicle comprising:
a first torque rod assembly comprising:
a first rod with one end fixed to an engine and the other end fixed to a vehicle body,
an inertial mass supported on the first rod, and
an actuator that reciprocates the inertial mass in an axial direction of the first rod; and
a second torque rod assembly comprising:
a second rod with one end fixed to the engine and the other end fixed to a sub-frame that is installed on the vehicle body via an elastic member,
wherein the second torque assembly has no inertial mass and no actuator,
wherein a rigid body resonant frequency of the second torque rod assembly in both pitch and vertical directions is set higher than a rigid body resonant frequency in an engine support direction.

6. An anti-vibration device for a vehicle comprising:
a first torque rod assembly comprising:
a first rod with one end fixed to an engine and the other end fixed to a vehicle body,
an inertial mass supported on the first rod, and
an actuator that reciprocates the inertial mass in an axial direction of the first rod; and
a second torque rod assembly comprising:
a second rod with one end fixed to the engine and the other end fixed to a sub-frame that is installed on the vehicle body via an elastic member,
wherein a primary rigid body resonant frequency of the sub-frame is set less than a primary elasticity resonant frequency of the engine,
wherein a rigid body resonant frequency of the first torque rod assembly in an engine torque support direction is set equal to or less than a primary resonant frequency of the engine, and wherein a rigid body resonant frequency of the second torque rod assembly in the engine torque support direction is set equal to or greater than the primary rigid body resonant frequency of the sub-frame and equal to or less than the primary elasticity resonant frequency of the engine.

7. The anti-vibration device of claim 1, wherein the sub-frame is a suspension frame that supports a suspension device installed on the vehicle body.

8. The anti-vibration device of claim 2, wherein a large diameter end of the second rod is configured such that the maximum length in a vertical direction of the vehicle body is set shorter than a maximum length in a lateral direction of the vehicle body.

9. The anti-vibration device of claim 2, wherein a small diameter end of the second rod is fixed to the sub-frame or the engine from an axial direction along the lateral direction of the vehicle body.

10. The anti-vibration device of claim 3, wherein a small diameter end of the second rod is fixed to the sub-frame or the engine from an axial direction along the lateral direction of the vehicle body.

11. The anti-vibration device of claim 8, wherein a small diameter end of the second rod is fixed to the sub-frame or the engine from an axial direction along the lateral direction of the vehicle body.

12. The anti-vibration device of claim 2, wherein a rigid body resonant frequency of the second torque rod assembly in both pitch and vertical directions is set higher than a rigid body resonant frequency in an engine support direction.

* * * * *